(12) United States Patent
Binder et al.

(10) Patent No.: US 11,916,467 B2
(45) Date of Patent: Feb. 27, 2024

(54) SLIP RING SYSTEM WITH IMPROVED COOLING

(71) Applicant: Flender Gmbh, Bocholt (DE)

(72) Inventors: Herbert Binder, Neuburg (DE); Daniel Friedl, Fürstenzell (DE); Robert Gruber, Ruhstorf (DE); Oliver Memminger, Neuburg a. Inn (DE); Andrej Raskopf, Passau (DE); Klaus Schifferer, Neuhaus am Inn (DE)

(73) Assignee: Flender GmbH, Bocholt (DE)

( * ) Notice: Subject to any disclaimer, the term of this patent is extended or adjusted under 35 U.S.C. 154(b) by 121 days.

(21) Appl. No.: 17/613,352

(22) PCT Filed: Apr. 3, 2020

(86) PCT No.: PCT/EP2020/059546
§ 371 (c)(1),
(2) Date: Nov. 22, 2021

(87) PCT Pub. No.: WO2020/239301
PCT Pub. Date: Dec. 3, 2020

(65) Prior Publication Data
US 2022/0224204 A1    Jul. 14, 2022

(30) Foreign Application Priority Data

May 28, 2019 (EP) .................................... 19177085

(51) Int. Cl.
*H02K 9/28* (2006.01)
*H02K 5/14* (2006.01)
(Continued)

(52) U.S. Cl.
CPC .............. *H02K 9/28* (2013.01); *F03D 80/60* (2016.05); *H01R 39/08* (2013.01); *H02K 5/141* (2013.01);
(Continued)

(58) Field of Classification Search
CPC .......... H02K 9/28; H02K 5/141; H01R 39/08; H01R 39/38
See application file for complete search history.

(56) References Cited

U.S. PATENT DOCUMENTS 3,984,716 A  * 10/1976 Stark .................... H02K 13/003
                                                        310/227
4,137,474 A     1/1979 Krieger
                                    (Continued)

FOREIGN PATENT DOCUMENTS

CA      3138621 A1 * 12/2020 ............. F03D 80/60
CN    103609007 A    2/2014
                                    (Continued)

OTHER PUBLICATIONS

International Search Report issued by the European Patent Office in International Application PCT/EP2020/059546 dated Aug. 4, 2020.
(Continued)

*Primary Examiner* — Pedro J Cuevas
(74) *Attorney, Agent, or Firm* — Henry M. Feiereisen LLC (57) ABSTRACT

A slip ring system of an electrically excited dynamoelectric machine can be designed to be closed or open and includes a carrier segment configured to include a brush holder which includes a brush pocket for receiving a brush. The brush holder includes means for cooling the brush in the brush holder and/or for cooling the brush holder and has a surface-enlarging structure so as to enable a cooling air flow to be guided within the slip ring system and thereby cool the brush holder and/or brush pocket.

14 Claims, 6 Drawing Sheets

(51) Int. Cl.
*H02K 7/18* (2006.01)
*H02K 9/26* (2006.01)
*F03D 80/60* (2016.01)
*H01R 39/08* (2006.01)

(52) U.S. Cl.
CPC .............. *H02K 7/183* (2013.01); *H02K 9/26* (2013.01); *F05B 2220/706* (2013.01); *F05B 2260/232* (2013.01)

(56) References Cited

U.S. PATENT DOCUMENTS

| | | | | |
|---|---|---|---|---|
| 4,284,914 | A * | 8/1981 | Hagenlocher | H02K 11/05 310/68 D |
| 6,081,054 | A * | 6/2000 | Kashihara | H02K 19/36 310/58 |
| 6,664,674 | B2 * | 12/2003 | Ihata | H02K 11/05 310/68 D |
| 6,812,604 | B2 * | 11/2004 | Braun | H02K 11/05 310/58 |
| 7,619,333 | B2 * | 11/2009 | Koumura | H02K 11/05 310/58 |
| 7,843,080 | B2 * | 11/2010 | Jansen | H02K 9/14 290/55 |
| 8,643,234 | B2 * | 2/2014 | Shirakata | H02K 11/05 310/71 |
| 9,143,019 | B2 * | 9/2015 | Maeda | H02K 11/05 |
| 9,479,029 | B2 * | 10/2016 | Fukase | H02K 9/28 |
| 9,570,962 | B2 * | 2/2017 | Shimano | H02K 11/05 |
| 9,577,495 | B2 * | 2/2017 | Fukase | H02K 11/33 |
| 9,653,969 | B2 * | 5/2017 | Fukase | H02K 9/28 |
| 9,698,646 | B2 * | 7/2017 | Shirakata | H02K 5/10 |
| 10,069,374 | B2 * | 9/2018 | Maeda | H02K 19/365 |
| 11,336,152 | B2 * | 5/2022 | Binder | H02K 13/003 |
| 2001/0030472 | A1 * | 10/2001 | Ihata | H02K 9/06 310/68 C |
| 2004/0100808 | A1 * | 5/2004 | Braun | H02K 9/06 363/144 |
| 2010/0140952 | A1 * | 6/2010 | Jansen | H02K 9/14 290/55 |
| 2010/0301692 | A1 * | 12/2010 | Shirakata | H02K 11/05 310/89 |
| 2014/0001915 | A1 * | 1/2014 | Fukase | H02K 9/28 310/227 |
| 2014/0035431 | A1 * | 2/2014 | Fukase | H01R 39/388 310/227 |
| 2014/0070645 | A1 * | 3/2014 | Maeda | H02K 9/06 310/64 |
| 2014/0125168 | A1 * | 5/2014 | Fukase | H02K 11/33 310/64 |
| 2014/0145526 | A1 * | 5/2014 | Shirakata | H02K 11/33 310/52 |
| 2014/0203675 | A1 * | 7/2014 | Maeda | H02K 9/06 310/59 |
| 2015/0054363 | A1 * | 2/2015 | Shimano | H01R 39/38 310/59 |
| 2018/0166844 | A1 | 6/2018 | Maier et al. | |
| 2021/0013779 | A1 * | 1/2021 | Binder | H02K 9/06 |

FOREIGN PATENT DOCUMENTS

| | | | |
|---|---|---|---|
| CN | 207732237 U | 8/2018 | |
| CN | 208046397 U | 11/2018 | |
| EP | 3291423 | 3/2018 | |
| EP | 3745544 A1 * | 12/2020 | ............ F03D 80/60 |
| GB | 2367193 A * | 3/2002 | ............ H01R 39/38 |
| JP | S5028606 | 3/1975 | |

OTHER PUBLICATIONS

Chinese Search Report dated May 8, 2023 with respect to counterpart Chinese patent application 202080039385.6.
Translation of Chinese Search Report dated May 8, 2023 with respect to counterpart Chinese patent application 202080039385.6.

* cited by examiner

SLIP RING SYSTEM WITH IMPROVED COOLING

CROSS-REFERENCES TO RELATED APPLICATIONS

This application is the U.S. National Stage of International Application No. PCT/EP2020/059546, filed Apr. 3, 2020, which designated the United States and has been published as International Publication No. WO 2020/239301 A1 and which claims the priority of European Patent Application, Serial No. 19177085.8, filed May 28, 2019, pursuant to 35 U.S.C. 119(a)-(d).

BACKGROUND OF THE INVENTION

The invention relates to a brush holder of a slip ring system of a dynamoelectric excited machine, a carrier segment with brush holders of this kind, a slip ring system with carrier segments of this kind, a ventilation system of a slip ring system, and a dynamoelectric machine.

Slip ring systems are used to introduce an electrical excitation into the rotating part of a dynamoelectric machine, i.e. the rotor. Due to the ever-increasing power of dynamo-electric machines, for example wind turbine generators, the transmittable electrical power that is required for them is becoming increasingly greater. This leads to additional heating of the slip ring systems, the heat dissipation of which is becoming increasingly more difficult due to additional cost and space optimization of these slip ring systems and their components. Due to the higher current loads of the slip ring system, which it is now sought to achieve alongside a more compact design, the temperatures, in particular of the brushes and the brush holders, increase considerably. Excessive temperature increases cause damage to the slip ring system and also to the brushes.

In order to counteract the rising temperatures, slip ring bodies with larger outer diameters are used from a certain size of dynamoelectric machine. For this purpose, the brush holders used, which are also referred to as brush bridges, are also dimensioned larger, accordingly. However, this means that the working area of the slip ring system takes up considerably more space. Increasing the size of the slip ring system, such as slip ring housings and their components, results in higher material costs. Furthermore, this power-related increase in size also leads to an unwanted increase in the outer dimensions of the dynamoelectric machine.

On this basis, the object of the invention is to create a slip ring system that does not exceed the maximum permissible temperatures of the slip ring system and its components, even with a comparatively compact design of the slip ring system.

SUMMARY OF THE INVENTION

The stated object is achieved by a brush holder of a slip ring system, of an electrically excited dynamoelectric machine, wherein the brush holder provides means for cooling brushes in the brush holder and/or for cooling the brush holder.

With the brush holder according to the invention, each brush in the brush holder can now be cooled comparatively well, so that the power transmittable Into a rotor of a dynamoelectric machine can be increased.

The stated object can also be achieved by a carrier segment comprising one or more brush holders according to the invention.

This helps to equalize the power flow or current across the brushes of an electrical phase of a slip ring system.

The stated object is also achieved by a slip ring system comprising one or more carrier segments according to the invention. The improved cooling performance of brushes and/or brush holder and thus of a carrier system also means that the slip ring system is almost uniformly thermally loaded and sufficiently cooled, resulting in a compact design of the slip ring system.

The stated object is also achieved by a ventilation system comprising a slip ring system according to the invention. The ventilation system guides air within the slip ring system, which is designed to be closed or open, in such a way that brush holders and/or brush pockets and/or brushes can be cooled. This is achieved by providing the required cooling air flow generated by radial and/or axial fans within or on the slip ring system.

The stated object is also achieved by a dynamoelectric machine, in particular generator of a wind turbine comprising a ventilation system according to the invention or a slip ring system according to the invention.

By enlarging the surface of the brush pockets by means of ribs, needles or nubs on the surface of the brush pockets, and also optionally recesses on the brush pockets, the cooling surface of the brush pockets and/or the surface of the brushes over which a cooling air flow passes is enlarged. The ribs in this case can be rectangular ribs, triangular ribs, trapezoidal ribs, or concave or convex parabolic ribs, just as the needles can be cylindrical, conical, concave parabolic or convex parabolic needles or nubs.

Air is guided past the brush pockets and brush holders, which have surface-enlarging structures, by means of at least one fan arranged within the slip ring system.

Advantageously, corresponding fans can be used here which generate a radial air flow and/or a cooling air flow running in the circumferential direction. This can be assisted by arranging the nubs, needles or ribs correspondingly in the flow direction of a generated cooling air flow.

By reducing the operating temperatures in the slip ring system, lower temperatures are thus created, which also allow comparatively smaller overall dimensions of a slip ring system and its adjacent components. Furthermore, the power transmitted from the brushes to the corresponding slip ring can also be operated with comparatively fewer brushes per electrical phase, without the brushes having cooling problems.

This means that higher power levels of the slip ring systems as a whole and thus of the dynamoelectric machine are possible.

Ventilation of the slip ring system is thus possible by means of forced-air ventilation, as well as or additionally by means of external ventilation. The cooling air flow or the cooling air flows are generated by fans in and/or on the slip ring system.

The outside air, which is drawn into the slip ring system as cooler air via the cooling openings, is guided within the slip ring system directly to the brush pocket, the brush holder and/or the brushes via cooling air ducts or ducting devices. Since these are the critical heat sources, they are now directly cooled directly with the so-called cold air flow.

Existing fans in the slip ring system, such as radial fans for example, can thus be supported.

In a slip ring system with forced-air ventilation, cooler ambient air is drawn in and distributed in the slip ring system by fans and/or ducting devices, in particular to the heat sources. The air now heated in the slip ring system at the brush pockets, the brush holders and/or the brushes is discharged from the slip ring chamber into the surrounding environment. The air flow is generated here by extractor and/or forced-draft fans, which are embodied as axial or radial fans.

Filter mats at the inlet and/or outlet can filter the polluted air.

In a closed slip ring system, the internal cooling circuit recooled in an intercooler is distributed by fans and/or ducting devices, in particular to the heat sources within the closed housing of the slip ring system. The air now heated in the slip ring system at the brush pockets, the brush holders and/or the brushes is directed from the slip ring chamber into the intercooler. This air flow is generated by extractor and/or forced-draft fans, which are embodied as axial or radial fans and are arranged within the housing of the slip ring system.

BRIEF DESCRIPTION OF THE DRAWING

The invention and further advantageous embodiments of the invention are explained in more detail by means of embodiment examples illustrated in principle. These show:
FIG. 1 a brush holder,
FIG. 2 to FIG. 5 in each case a carrier segment with brush holder,
FIG. 6 to FIG. 8 in each case a slip ring,
FIG. 9 a brush bridge, and
FIG. 10 a dynamoelectric machine with slip ring system shown in principle.

DETAILED DESCRIPTION OF PREFERRED EMBODIMENTS

Figure 1:
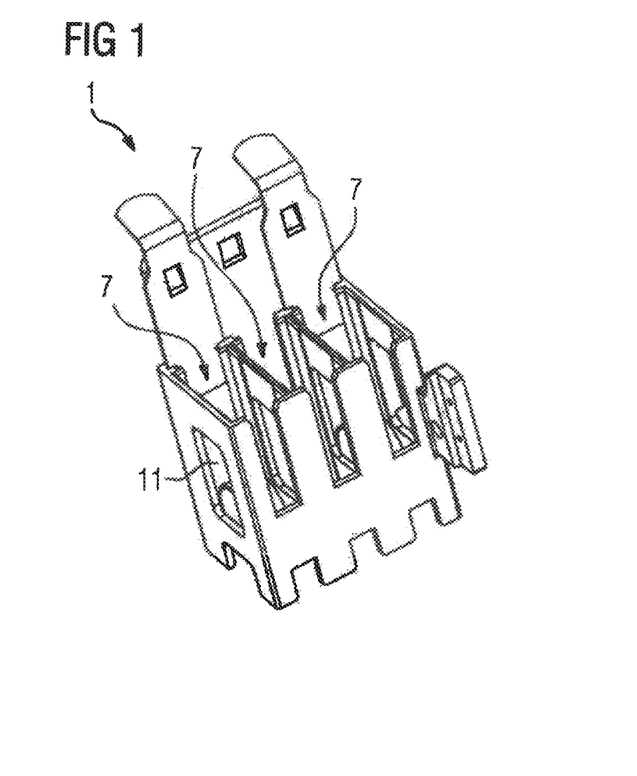

FIG. 1 shows a brush holder 1 with brush pockets 7, in this case three parallel receiving pockets, into which brushes 8 can be inserted. In this embodiment example, the brush pockets 7 are only provided with recesses 11, in particular to facilitate cooling of the brushes 8.

Figure 2:
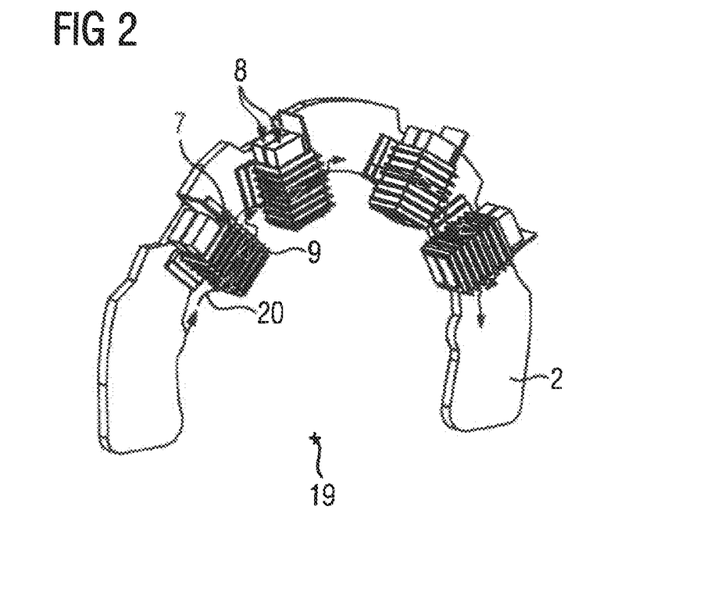

FIG. 2 shows a carrier segment 2 on which a plurality of brush holders 1 are arranged, wherein one carrier segment 2 is provided for each electrical phase U, V, M of a slip ring system 13. In this embodiment, the brush pockets 7 have ribs 9, which run substantially tangentially to an axis 19.

In principle, embodiments of the brush pockets 7 or brush holders 1 are also possible in which recesses 11 and surface-enlarging structures, such as ribs 9, are realized.

Figure 3:
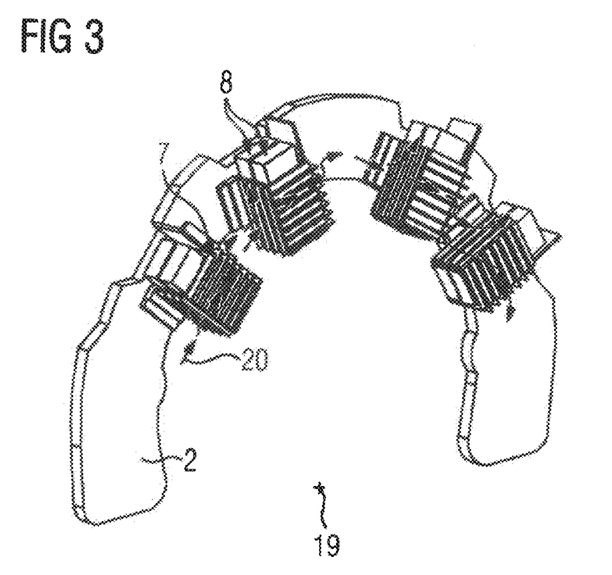

FIG. 3 shows a mixture of shapes of the ribs 9, in that on the one hand a tangential shape and on the other hand a radial shape are present on a brush holder 1. Thus, a cooling air flow is not only guided in the tangential direction but also in the radial direction, which further improves the cooling of this brush holder 1.

Figure 4:
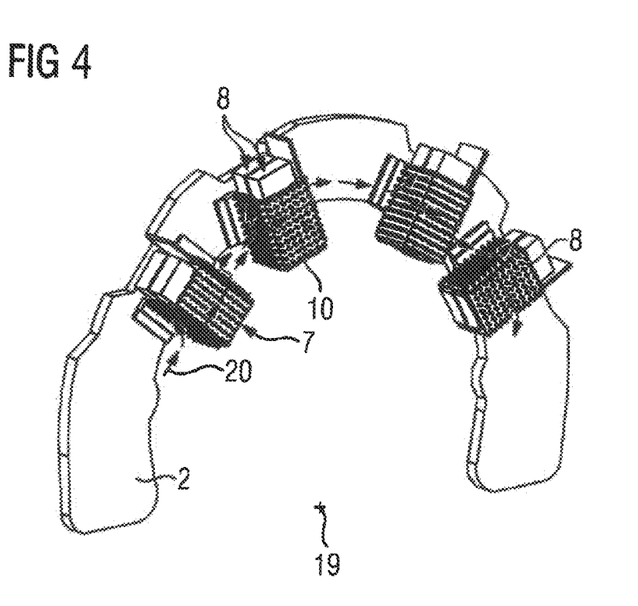

FIG. 4 shows a further carrier segment 2 with brush pockets 7, the surface of which is provided with needles 10 or nubs to enlarge the surface area and thus improve cooling. Here, too, a cooling air flow 20 can be directed both in the tangential and radial directions.

Figure 5:
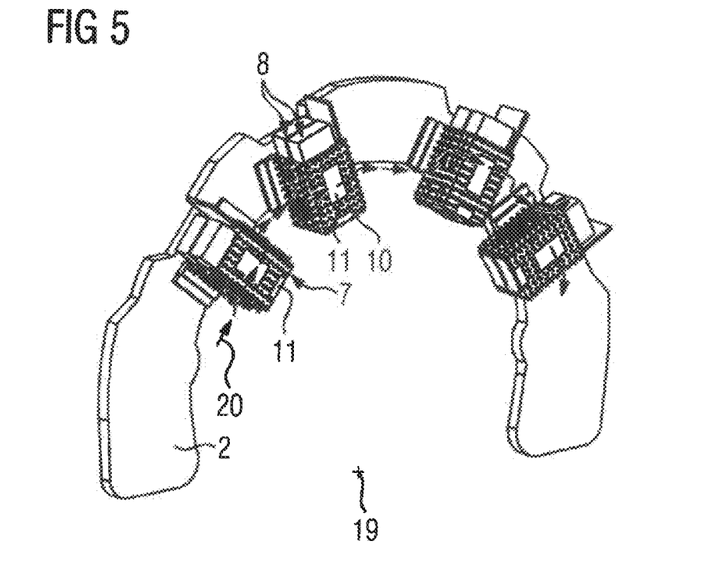

FIG. 5 shows a brush pocket 7, the holding function of which has been minimized by additionally providing a predetermined number of recesses 11 on the brush pocket 7. Needles 10 are attached to the remaining guides of the brush 8, so that direct cooling of the brush 8 and cooling of the brush pocket 7 are possible.

Figure 6:
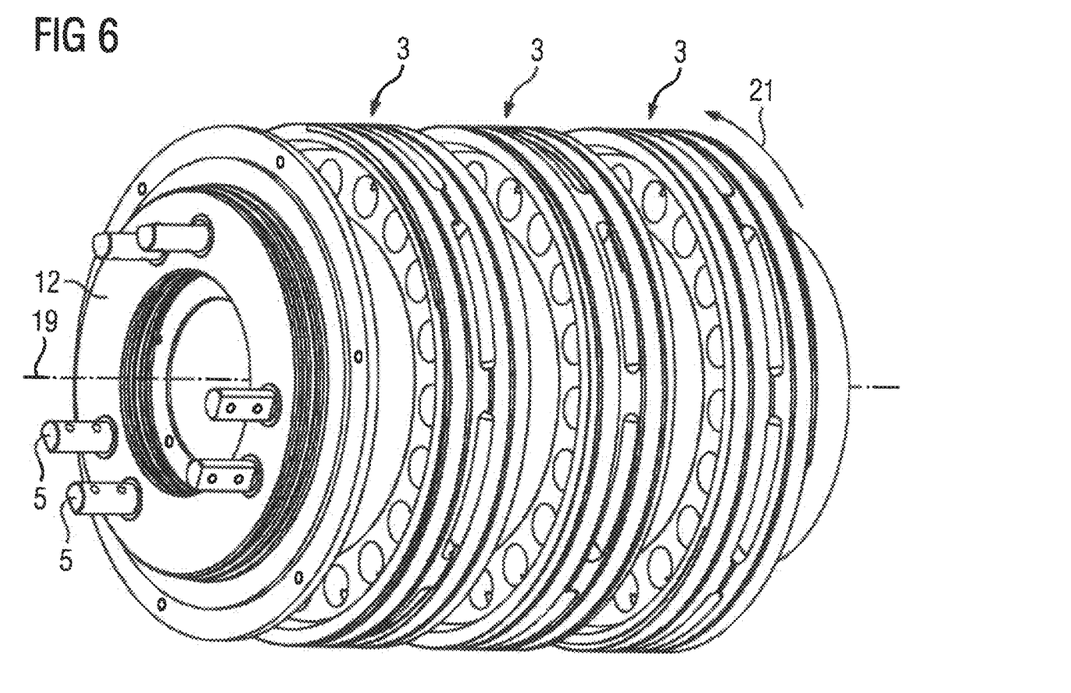

FIG. 6 shows a slip ring unit comprising three individual slip rings 3, which are arranged axially one behind the other and are separated from each other by an insulation 4. Each slip ring 3 is provided for an electrical phase U or V or M. At one axial end of this arrangement there is a support ring 12, from which contact points 5 project axially parallel and which permit an electrical connection of a winding system 17 of a rotor 16.

Figure 7:
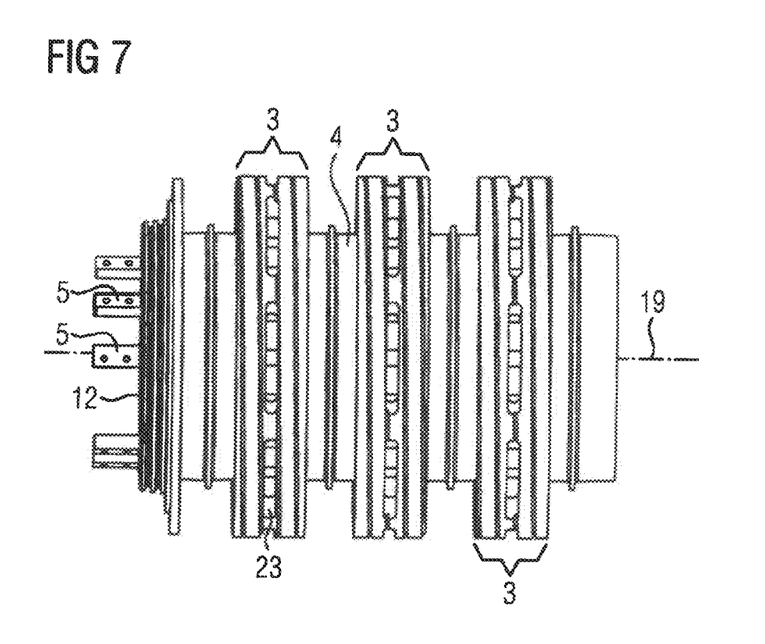

FIG. 7 shows a transverse view of the slip ring system 3 according to FIG. 6.

Figure 8:
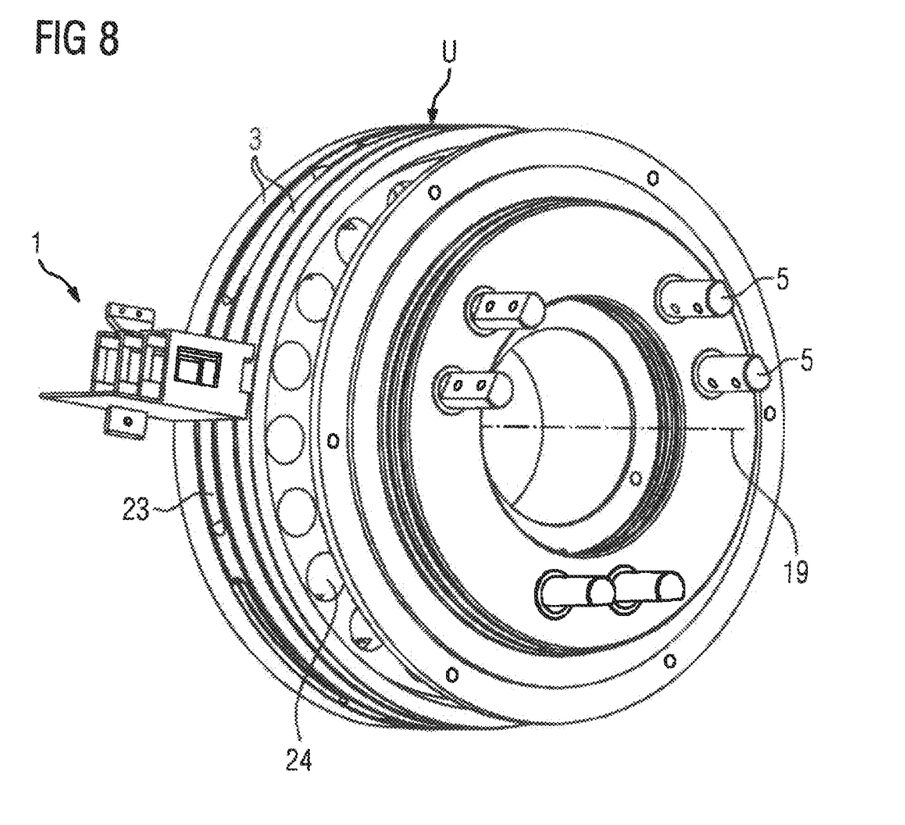

FIG. 8 shows a single slip ring 3, for example of the phase U of a slip ring unit, with the previously named elements, such as contact points 5, support ring 12, radial cooling openings 23 and axial cooling openings 24. Furthermore, it is shown there in principle how a brush holder 1 can be arranged on the slip ring 3.

Figure 9:
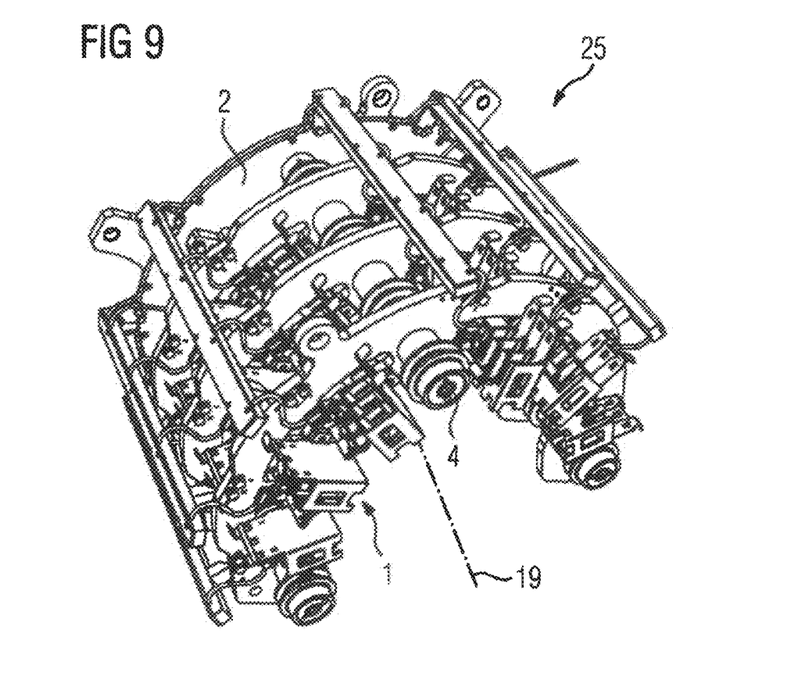

FIG. 9 shows a brush bridge 25 in which four carrier segments 2 are arranged axially one behind the other, wherein, for example, three carrier segments 2 are assigned to one electrical phase U, V, M each, and a carrier segment 2 has brushes 8 for grounding.

Figure 10:
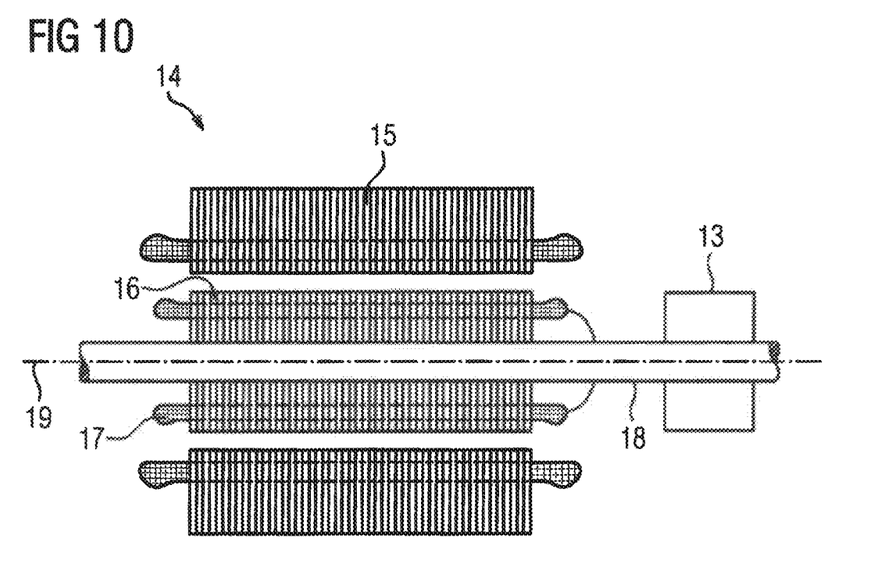

FIG. 10 shows in principle the arrangement of a slip ring system 13 on a shaft 18, wherein the slip rings 3, similarly to the rotor 16, rotate about the axis 19. The slip ring system 13 is positioned here on the end face of the rotor 16.

A slip ring system 13 has a brush bridge with carrier segments 2 and a slip ring unit with slip rings 3. A carrier segment 2 has one or more brush holders 1, each of which is to be assigned to a slip ring 3. Each brush holder 1 has one or more brush pockets 7, in which the brushes 8 are positioned. The brushes 8 are pressed onto the slip ring 3 by means of a device (not shown in more detail) in order to ensure proper contact. Furthermore, the brushes 8 are monitored with respect to their wear by corresponding equipment. Furthermore, the slip ring system 13 has contact points 5, a support ring 12, radial cooling openings 23 and axial cooling openings 24.

In a forced-air-ventilated slip ring system 13, cooler ambient air is preferably drawn in by fans and distributed in the slip ring system 13 by, as necessary, further fans and/or ducting devices, in particular to the heat sources. The air now heated in the slip ring system 13 at the brush pockets 7, the brush holders 1 and/or the brushes 8 is conducted out of the slip ring chamber into the surrounding environment. The air flow is generated by extractor and/or forced-draft fans, which are embodied as axial or radial fans and are arranged on or in the slip ring chamber.

Filter mats at the inlet and/or outlet can filter the polluted air.

In a closed slip ring system 13, the internal cooling circuit, which is recooled in an intercooler, is distributed by fans and/or ducting devices, in particular to the heat sources within the closed housing of the slip ring system 13. The air now heated in the slip ring system 13 at the brush pockets 7, the brush holders 1 and/or the brushes 8 is routed out of the slip ring chamber and into the intercooler (not shown in more detail). This air flow is generated here by extractor and/or forced-draft fans, which are embodied as axial or radial fans and are arranged within the housing of the slip ring system 13.

Such compact slip ring systems 13 are particularly suitable for dynamoelectric machines 14 with comparatively high power in the MW range. These machines 14 are particularly suitable as generators, especially doubly fed asynchronous machines of wind turbines, since the available installation space in a nacelle of a wind turbine is relatively limited, and yet comparatively high power is to be transmitted in the generator.

The invention claimed is:

1. A ventilation system of a slip ring system of an electrically excited dynamoelectric machine, the slip ring system defining an axis about which the slip ring system rotates comprising:
   a carrier segment that includes a brush holder comprising a brush pocket for receiving a brush, and a surface-enlarging structure, and
   means for cooling the brush in the brush holder or for cooling the brush holder with a cooling air flow guided in or on the slip ring system, which is closed or open, in a radial and in a circumferential direction past the brush holder,
   wherein the radial and the circumferential directions are orthogonal to the axis.

2. The ventilation system of claim 1, wherein the slip ring system includes axial and radial cooling openings.

3. The ventilation system of claim 1, further comprising a fan for generating the cooling air flow.

4. The ventilation system of claim 1, wherein the surface enlarging structure comprises at least one member selected from the group consisting of rib, needle, and recess, said surface-enlarging structure being provided on a surface of the brush holder or of the brush pocket to enable cooling of the brush or of the brush holder.

5. The ventilation system of claim 1, wherein the surface-enlarging structure comprises recesses provided on different sides of the brush pocket and aligned in a radial direction and a circumferential direction of the dynamoelectric machine.

6. A dynamoelectric machine, comprising:
   a slip ring system which is closed or open and includes a carrier segment comprising a brush holder which includes a brush pocket for receiving a brush and has a surface-enlarging structure; and
   a ventilation system including means for cooling the brush in the brush holder or for cooling the brush holder with a cooling air flow guided in or on the slip ring system in a radial and in a circumferential direction in relation to an axis of the slip ring system, about which axis the slip ring system rotates, past the brush holder,
   wherein the radial and the circumferential directions are orthogonal to the axis.

7. The dynamoelectric machine of claim 6, constructed as a generator embodied as a doubly fed asynchronous machine.

8. The dynamoelectric machine of claim 6, wherein the slip ring system includes axial and radial cooling openings.

9. The dynamoelectric machine of claim 6, wherein the ventilation system includes a fan for generating the cooling air flow.

10. The dynamoelectric machine of claim 6, wherein the surface enlarging structure comprises at least one member selected from the group consisting of rib, needle, and recess, said surface-enlarging structure being provided on a surface of the brush holder or of the brush pocket to enable cooling of the brush or of the brush holder.

11. A slip ring system of an electrically excited dynamo-electric machine, said slip ring system defining an axis about which the slip ring system rotates and comprising:
   a carrier segment that includes a brush holder comprising a brush pocket for receiving a brush, and a surface-enlarging structure, and
   means for cooling the brush in the brush holder or for cooling the brush holder with a cooling air flow guided in or on the slip ring system, which is closed or open, in a radial and in a circumferential direction in relation to the axis past the brush holder,
   wherein the radial and the circumferential directions are orthogonal to the axis.

12. The slip ring system of claim 11, wherein the slip ring system includes a slip ring having axial and radial cooling openings.

13. The slip ring system of claim 11, further comprising a fan for generating the cooling air flow.

14. The slip ring system of claim 11, wherein the surface-enlarging structure comprises at least one member selected from the group consisting of rib, needle, and recess, said surface-enlarging structure being provided on a surface of the brush holder and/or of the brush pocket to enable cooling of the brush and/or of the brush holder.

* * * * *